US012316918B2

(12) United States Patent
Kim et al.

(10) Patent No.: US 12,316,918 B2
(45) Date of Patent: May 27, 2025

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Gaeul Kim, Suwon-si (KR); Seokjae Oh, Suwon-si (KR); Byoungho Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 7 days.

(21) Appl. No.: 18/405,229

(22) Filed: Jan. 5, 2024

(65) Prior Publication Data
US 2024/0163520 A1 May 16, 2024

Related U.S. Application Data

(63) Continuation of application No. PCT/KR2023/016667, filed on Oct. 25, 2023.

(30) Foreign Application Priority Data

Nov. 15, 2022 (KR) .......................... 10-2022-0152878

(51) Int. Cl.
H04N 21/4788 (2011.01)
G06F 40/40 (2020.01)
H04N 21/44 (2011.01)

(52) U.S. Cl.
CPC ......... *H04N 21/4788* (2013.01); *G06F 40/40* (2020.01); *H04N 21/44008* (2013.01)

(58) Field of Classification Search
None
See application file for complete search history.

(56) References Cited

U.S. PATENT DOCUMENTS 10,668,373 B2 * 6/2020 Nomura ................. A63F 13/352
10,905,952 B2 * 2/2021 Nomura .................. A63F 13/45
(Continued)

FOREIGN PATENT DOCUMENTS

JP  2006-270634  10/2006
JP  2010-62963   3/2010
(Continued)

OTHER PUBLICATIONS

International Search Report dated Feb. 8, 2024 for corresponding application PCT/KR2023/016667.
(Continued)

Primary Examiner — Quang N Nguyen
(74) Attorney, Agent, or Firm — STAAS & HALSEY LLP

(57) ABSTRACT

An electronic apparatus including: a communication interface; a memory to store meta data corresponding, respectively, to a plurality of contents including a first content and a second content; and at least one processor configured to acquire characteristic information corresponding to the first content and the second content, respectively, based on first content information of the first content and second content information of the second content received through the communication interface, provided the first content information of the first content and the second content information of the second content, do not match each other, and provide a chatting room for the first content and the second content provided the first content and the second content are a same content based on the received first content information and the second content information, the acquired characteristic information, and the meta data stored in the memory.

18 Claims, 12 Drawing Sheets

(56) References Cited

U.S. PATENT DOCUMENTS

| | | | |
|---|---|---|---|
| 11,575,962 B2 | 2/2023 | Choi et al. | |
| 2008/0282286 A1 | 11/2008 | Or | |
| 2015/0271316 A1* | 9/2015 | Kim | H04M 1/72436 715/752 |
| 2017/0225082 A1* | 8/2017 | Suwa | G06F 13/00 |
| 2021/0195283 A1 | 6/2021 | Choi et al. | |
| 2024/0375000 A1* | 11/2024 | Kang | A63F 13/812 |

FOREIGN PATENT DOCUMENTS

| | | |
|---|---|---|
| JP | 2018-92324 | 6/2018 |
| KR | 10-2012-0091987 A | 8/2012 |
| KR | 10-1192207 | 10/2012 |
| KR | 10-2014-0144545 | 12/2014 |
| KR | 10-2017-0063077 A | 6/2017 |
| KR | 10-2018-0050943 A | 5/2018 |
| KR | 10-2019-0022660 | 3/2019 |
| KR | 10-1963200 | 3/2019 |
| KR | 10-2019-0132909 | 11/2019 |
| KR | 10-2021-0153347 A | 12/2021 |
| KR | 10-2022-0140187 A | 10/2022 |
| WO | WO 2018/004719 A1 | 1/2018 |

OTHER PUBLICATIONS

Written Opinion dated Feb. 8, 2024 for corresponding application PCT/KR2023/016667.

* cited by examiner

ELECTRONIC APPARATUS AND METHOD FOR CONTROLLING THEREOF

CROSS-REFERENCE TO RELATED APPLICATION(S)

This application is a continuation application, under 35 U.S.C. § 111(a), of international application No. PCT/KR2023/016667, filed on Oct. 25, 2023, which claims priority under 35 U. S. C. § 119 to Korean Patent Application No. 10-2022-0152878 filed on Nov. 15, 2022, the disclosures of which are incorporated herein by reference in their entireties.

BACKGROUND

Field

Apparatuses and methods consistent with the disclosure relate to an electronic apparatus and a controlling method thereof, and more particularly, to an electronic apparatus which may identify the same content from a plurality of contents in consideration of the characteristic information and identification information of an extracted content, and providing a chatting room for users watching the same content based thereon, and a controlling method thereof.

Description of the Related Art

Various types of electronic apparatuses have been developed and supplied in accordance with the development of electronic technology. In particular, actively developed is technology of an electronic apparatus which may provide a user with a content through a display while simultaneously performing a chat service.

In particular, in case of a content that is broadcast live simultaneously in a plurality of countries, users from different countries who watch the same content may chat in the same chatting room. Meanwhile, each country may use a different broadcaster transmitting the content, and thus have a different content identification (ID) even in case of the same content. There is a need for technology for accurately identifying the same content from the plurality of contents in order for the users from different countries who watch the same content to chat in the same chatting room.

In addition, it is necessary to provide the chat service in consideration of characteristics of each user in case that the users from different countries who watch the same content chat in the same chatting room. For example, the user may not want to receive a chat input in a language different from the user's language. Alternatively, the user may want to receive a chat in which the chat input in a different language is translated into the same language as the user's language.

SUMMARY

According to one or more embodiments of the disclosure, an electronic apparatus includes: a communication interface; a memory to store meta data corresponding, respectively, to a plurality of contents including a first content and a second content; and at least one processor configured to acquire characteristic information corresponding to the first content and the second content, respectively, based on the first content information of the first content and second content information of the second content received through the communication interface, provided the first content information of the first content and the second content information of the second content do not match each other.

The at least one processor is configured to provide a chatting room for the first content and the second content based on the first content and the second content are a same content based on the received content information, the acquired characteristic information, and the meta data stored in the memory.

According to one or more embodiments of the disclosure, a controlling method of an electronic apparatus includes: acquiring characteristic information corresponding to a first content and a second content based on first content information of the first content and second content information of the second content among a plurality of contents including the first content and the second content do not match each other.

The controlling method includes providing a chatting room for the first content and the second content based on the first content and the second content are a same content based on the content information, the acquired characteristic information, and meta data each corresponding to the plurality of contents stored in a memory.

According to one or more embodiments of the disclosure, provided is a non-transitory computer-readable recording medium which stores a computer instruction causing an electronic apparatus to perform an operation in case of being executed by a processor of the electronic apparatus, the operation including: acquiring characteristic information corresponding to a first content and a second content based on first content information of the first content and second content information of the second content among a plurality of contents including the first content and the second content do not match each other.

The operation includes providing a chatting room for the first content and the second content in case that the first content and the second content are a same content based on the content information, the acquired characteristic information, and meta data each corresponding to the plurality of contents stored in a memory.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Hereinafter, the disclosure is described in detail with reference to the accompanying drawings.

Terms used in the specification are briefly described, and the disclosure is then described in detail.

General terms that are currently widely used are selected as terms used in embodiments of the disclosure in consideration of their functions in the disclosure. However, these terms may be changed depending on the intention of those skilled in the art or a judicial precedent, the emergence of a new technique, and the like. In addition, in a specific case, terms arbitrarily chosen by an applicant may exist. In this case, the meanings of such terms are mentioned in detail in corresponding descriptions of the disclosure. Therefore, the terms used in the disclosure need to be defined on the basis of the meanings of the terms and the contents throughout the disclosure rather than simple names of the terms.

In the specification, an expression "have," "may have," "include," "may include," or the like, indicates the existence of a corresponding feature (for example, a numerical value, a function, an operation or a component such as a part), and does not exclude the existence of an additional feature.

An expression, "at least one of A or/and B" may indicate either "A or B", or "both of A and B."

Expressions "first," "second," or the like, used in the specification may qualify various components regardless of a sequence or importance of the components. These expressions are used only to distinguish one component from another component, and do not limit the corresponding components.

In case that any component (for example, a first component) is mentioned to be "(operatively or communicatively) coupled with/to" or "connected to another component (for example, a second component)", it is to be understood that any component may be directly coupled to another component or may be coupled to another component through still another component (for example, a third component).

A term of a singular number may include its plural number unless explicitly indicated otherwise in the context. It is to be understood that a term "include," "formed of," or the like used in this application specifies the existence of features, numerals, steps, operations, components, parts or combinations thereof, which is mentioned in the specification, and does not preclude the existence or addition of one or more other features, numerals, steps, operations, components, parts or combinations thereof.

In the disclosure, a "module" or a "—er/—or" may perform at least one function or operation, may be implemented by hardware or software, or be implemented by a combination of hardware and software. In addition, a plurality of "modules" or a plurality of "—ers/—ors" may be integrated in at least one module to be implemented by at least one processor (not shown) except for a "module" or a "—er/or" that needs to be implemented by a specific hardware.

Figure 1:
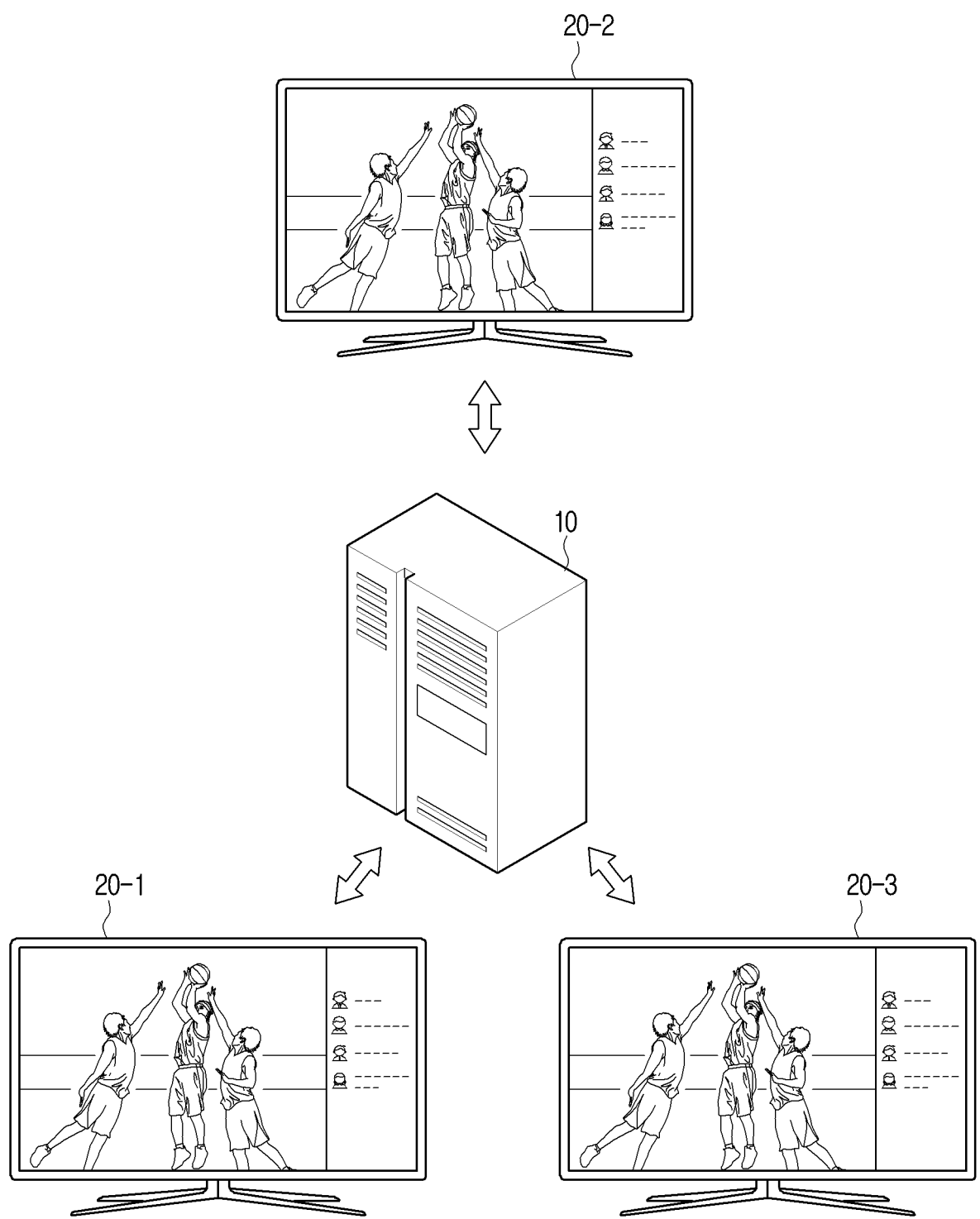
FIG. 1 is a view for schematically explaining a controlling method of an electronic apparatus according to one or more embodiments.

FIG. 1 is a view for schematically explaining a controlling method of an electronic apparatus according to one or more embodiments.

Referring to FIG. 1, an electronic apparatus 10 according to one or more embodiments may transmit/receive data with a plurality of external devices 20-1 to 20-3. In an example, the electronic apparatus 10 may be implemented as a server, and is not limited thereto. The plurality of devices 20-1 to 20-3 may be implemented as various devices which may provide a content corresponding to user input such as a smart television (TV), a tablet personal computer (PC), a monitor, a smartphone, a desktop computer, and a laptop computer. Meanwhile, in case that there exist the plurality of devices 20-1 to 20-3 displaying the same content, the electronic apparatus 10 according to one or more embodiments may provide a chatting room for the plurality of devices 20-1 to 20-3 displaying the same content, and may provide a chat service based thereon.

The electronic apparatus 10 according to one or more embodiments may receive a plurality of broadcast contents from an external server (not shown). In this case, there exist devices respectively corresponding to the plurality of broadcast contents (or devices respectively displaying the plurality of broadcast contents), and each device may display the corresponding broadcast content.

Meanwhile, in an example, content identification information received from different countries or different broadcasting companies may be different from each other even for the same broadcasting content. The electronic apparatus 10 may provide the chatting room for the plurality of devices displaying the same content by identifying the same content from the plurality of received contents and identifying a device displaying the same content based thereon.

In case that the chatting room is provided according to one or more embodiments, the electronic apparatus 10 may provide the chat service based on setting information of each of the plurality of devices corresponding to (or included in) the chatting room. In an example, the electronic apparatus 10 may receive information on whether to provide a first device with text information in a language different from that provided by the first device among the plurality of devices or information on whether to translate the text information in the language different from the language provided by the first device and provide the first device with the translated text information, and provide the chat service based thereon.

Accordingly, hereinafter, the description describes various embodiments of identifying the same content from the plurality of contents in consideration of characteristic information of each of the plurality of received contents, providing the chatting room for the devices corresponding to the same content, and providing the chat service in consideration of the characteristics of each device included in the provided chatting room.

Figure 2:
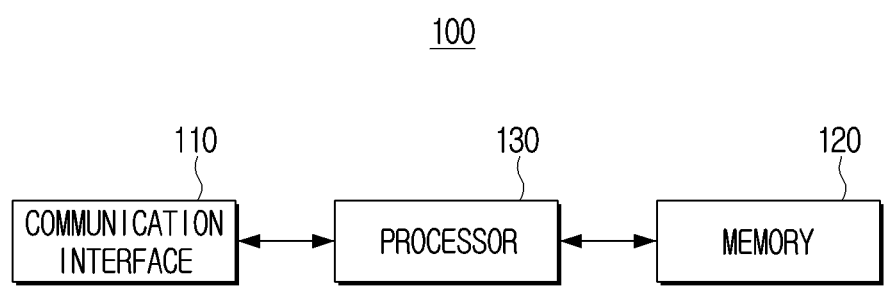
FIG. 2 is a block diagram showing a configuration of an electronic apparatus according to one or more embodiments.

FIG. 2 is a block diagram showing a configuration of an electronic apparatus according to one or more embodiments.

Referring to FIG. 2, an electronic apparatus 100 may include a communication interface 110, a memory 120, and at least one processor 130.

According to one or more embodiments, the electronic apparatus 100 may be implemented as the server. Meanwhile, the external server may transmit information to the electronic apparatus 100 in various ways. According to one or more embodiments, the external server may transmit text information corresponding to a user voice signal to the electronic apparatus 100. In detail, the external server may be a server performing a voice recognition function of converting the user voice signal into the text information.

In another example, the external server may transmit, to the electronic apparatus 100, at least one of the text information corresponding to the user voice signal or search result information corresponding to the text information. In detail, the external server may be a server performing a search result provision function of providing the search result information corresponding to the text information in addition to the voice recognition function of converting the user voice signal into the text information. For example, the external server may be a server performing both the voice recognition function and the search result provision function. For another example, the external server may perform only the voice recognition function and a separate server may perform the search result provision function. The external server may transmit the text information to the separate server to acquire a search result and acquire the search result corresponding to the text information from the separate server.

Meanwhile, the electronic apparatus 100 may communicate with the external device and the external server in various ways. According to one or more embodiments, the electronic apparatus 100 may use the same communication module for communication with the external device and the external server. For example, the electronic apparatus 100 may communicate with the external device by using a Bluetooth module, and also communicate with the external server by using the Bluetooth module.

In another example, the electronic apparatus 100 may use separate communication modules for communication with the external device and the external server. For example, the electronic apparatus 100 may communicate with the external device by using the Bluetooth module, and communicate with the external server by using an Ethernet modem or a wireless-fidelity (Wi-Fi) module.

According to one or more embodiments, the electronic apparatus 100 may perform an overall operation by itself. Alternatively, according to one or more embodiments, the electronic apparatus 100 may perform an operation of acquiring the characteristic information, and the external server may perform other operations. Alternatively, the electronic apparatus 100 may perform an operation of providing the chatting room, and the external server may perform other operations. Alternatively, according to one or more embodiments, the electronic apparatus may perform an operation of identifying whether first identification information included in first content information and second identification information included in second content information match each other, and the external server may perform other operations. That is, an operation subject of the operations described here may be changed according to implementation examples.

The communication interface 110 may input and output various types of data. For example, the communication interface 110 may receive and transmit the various types of data from the external device (e.g., source device), an external storage medium (e.g., universal serial bus (USB) memory), the external server (e.g., web hard), or the like by using a communication method such as an access point (AP)-based Wi-Fi, i.e., wireless local area network (LAN), a Bluetooth, a Zigbee, a wired/wireless LAN, a wide area network (WAN), Ethernet, an IEEE 1394, a high definition multimedia interface (HDMI), a USB, a mobile high-definition link (MHL), an audio engineering society/European broadcasting union (AES/EBU) communication, an optical communication, or a coaxial communication.

In an example, the communication interface 110 may use the same communication module (e.g., Wi-Fi module) to communicate with the external device such as a remote control and the external server.

In an example, the communication interface 110 may use different communication modules to communicate with the external device such as the remote control and the external server. For example, the communication interface 110 may use at least one of the Ethernet module or the Wi-Fi module to communicate with the external server, and may use the Bluetooth module to communicate with the external device such as the remote control. However, this case is only an example, and the communication interface 110 may use at least one communication module among various communication modules in case of communicating with the plurality of external devices or external servers.

The memory 120 may store data necessary for various embodiments of the disclosure. The memory 120 may be implemented in the form of a memory embedded in the electronic apparatus 100 or in the form of a memory detachable from the electronic apparatus 100, based on a data storing purpose. For example, data for driving the electronic apparatus 100 may be stored in the memory embedded in the electronic apparatus 100, and data for an extension function of the electronic apparatus 100 may be stored in the memory detachable from the electronic apparatus 100.

Meanwhile, the memory embedded in the electronic apparatus 100 may be implemented as at least one of a volatile memory (for example, a dynamic random access memory (DRAM), a static RAM (SRAM), or a synchronous dynamic RAM (SDRAM)), a non-volatile memory (for example, an one time programmable read only memory (OTPROM), a programmable ROM (PROM), an erasable and programmable ROM (EPROM), an electrically erasable and programmable ROM (EEPROM), a mask ROM, or a flash ROM, a flash memory (for example, a NAND flash or a NOR flash), a hard drive, or a solid state drive (SSD)). In addition, the memory detachable from the electronic apparatus 100 may be implemented in the form of a memory card (for example, a compact flash (CF), a secure digital (SD), a micro secure digital (Micro-SD), a mini secure digital (Mini-SD), an extreme digital (xD), or a multimedia card (MMC)), or an external memory which may be connected to a USB port (for example, a USB memory).

According to one or more embodiments, the memory 120 may store meta data each corresponding to the plurality of contents including a first content and a second content. In an example, the meta data may include at least one of identification (ID) information or schedule information each corresponding to the plurality of contents.

The ID information of the content may be numerical type information each corresponding to the content in an example, is not limited thereto, and may be title information of the content. The numerical type information each corresponding to the content may be information generated based on a predetermined rule, and may have ID information of different values based on the content. Meanwhile, the schedule information may be broadcast time information of the content, and in an example, the schedule information may include information on the broadcast start time and broadcast end time of the content. The memory 120 may store mapped schedule information each corresponding to the ID information.

At least one processor 130 (hereinafter referred to as the processor) may be electrically connected to the communication interface 110 and the memory 120 to control the overall operation of the electronic apparatus 100. The processor 130 may include one or more processors. In detail, the processor 130 may perform an operation of the electronic apparatus 100 according to the various embodiments of the disclosure by executing at least one instruction stored in the memory 120.

According to one or more embodiments, the processor 130 may be implemented as a digital signal processor (DSP) processing a digital video signal, a microprocessor, a graphics processing unit (GPU), an artificial intelligence (AI) processor, or a neural processing unit (NPU), or a timing controller (T-CON). However, the processor is not limited thereto, and may include one or more of a central processing unit (CPU), a micro controller unit (MCU), a micro processing unit (MPU), a controller, an application processor (AP), a communication processor (CP), and an ARM processor, or may be defined by this term. In addition, the processor 130 may be implemented in a system-on-chip (SoC) or a large scale integration (LSI) in which a processing algorithm is embedded, or may be implemented in the form of an application specific integrated circuit (ASIC) or a field programmable gate array (FPGA).

According to one or more embodiments, the processor 130 may be implemented as the digital signal processor (DSP), the microprocessor, or the time controller (T-CON). However, the processor is not limited thereto, and may include one or more of the central processing unit (CPU), the micro controller unit (MCU), the micro processing unit (MPU), the controller, the application processor (AP), the communication processor (CP), and the ARM processor, or may be defined by this term. In addition, the processor 130 may be implemented in the system-on-chip (SoC) or the large scale integration (LSI) in which the processing algorithm is embedded, or may be implemented in the form of the field programmable gate array (FPGA).

According to one or more embodiments, at least one processor 130 may receive the first content information and the second content information. In an example, the content may be a video type content. Meanwhile, the content information may include at least one of the identification information or video data of the content, and the identification information of the content may include the ID information of the content or country type information of the received content. This configuration is described in detail with reference to FIG. 4.

In an example, the processor 130 may receive the plurality of content information including the first content information and the second content information from the external device (e.g., the server) through the communication interface 110. Here, the first content and the second content may be the same content.

According to one or more embodiments, the processor 130 may identify whether the first content information and the second content information match each other.

In an example, in case of receiving the first content information of the first content and the second content information of the second content through the communication interface 110, the processor 130 may identify whether the first identification information included in the received first content information and the second identification information included in the second content information match each other. For example, in case of receiving the first identification information and the second identification information, the processor 130 may identify whether the first identification information and the second identification information match each other by comparing first country type information and first ID information, included in the received first identification information, with second country type information and second ID information, included in the second identification information, for each corresponding type.

For example, in case that at least one of the country type information or ID information of the first identification information and those of the second identification information does not match each other, the processor 130 may identify that the first identification information and the second identification information do not match each other. Alternatively, for example, in case that the first country type information and the second country type information match each other, and the first ID information and the second ID information match each other, the processor 130 may identify that the first identification information and the second identification information match each other.

According to one or more embodiments, the processor 130 may acquire the characteristic information each corresponding to the first content and the second content based on the received first content information and second content information in case that the first identification information and the second identification information do not match each other.

The characteristic information may be information acquired by processing image data included in the content. In an example, the characteristic information of the content may include at least one of fingerprint information corresponding to the content or image frame information corresponding to the content. That is, the characteristic information may have a different value based on a type of the content. Meanwhile, in an example, the characteristic information may be either the numerical type information or image type information, and is not limited thereto. The description describes a method of acquiring the fingerprint information in detail with reference to FIG. 9.

In an example, in case that the first identification information and the second identification information do not match each other, the processor 130 may acquire first fingerprint information corresponding to the first content based on the image data included in the received first content information, and acquire second fingerprint information corresponding to the second content based on the image data included in the received second content information.

According to one or more embodiments, the processor 130 may identify whether the first content and the second content are the same content. In an example, the processor 130 may identify whether the first content and the second content are the same content based on the received content information, the acquired characteristic information, and the information stored in the memory 120.

For example, the processor 130 may first identify whether the acquired the first fingerprint information has similarity of a predetermined value or more with the second fingerprint information. In case of identifying that the first fingerprint information and the second fingerprint information have the similarity of the predetermined value or more, the processor 130 may identify first schedule information corresponding to the first ID information and second schedule information corresponding to the second ID information, based on the information stored in the memory 120. In case that the identified first schedule information and second schedule information match each other, the processor 130 may identify the first content and the second content as the same content. This configuration is described in detail with reference to FIG. 5.

According to one or more embodiments, the processor 130 may provide the chatting room for the first content and the second content in case of identifying the first content and the second content as the same content. The processor 130 may identify at least one device included in the provided chatting room as the same group. In case of receiving a chat message received from at least one device belonging to the same group in real time, the processor 130 may transmit the received chat message to at least one device in the same group, thereby providing the user with the chat service.

For example, the processor 130 may identify at least one device receiving the first content and at least one device receiving the second content as being included in the same group, and provide a single chatting room including at least one device receiving the first content and at least one device receiving the second content.

Figure 3:
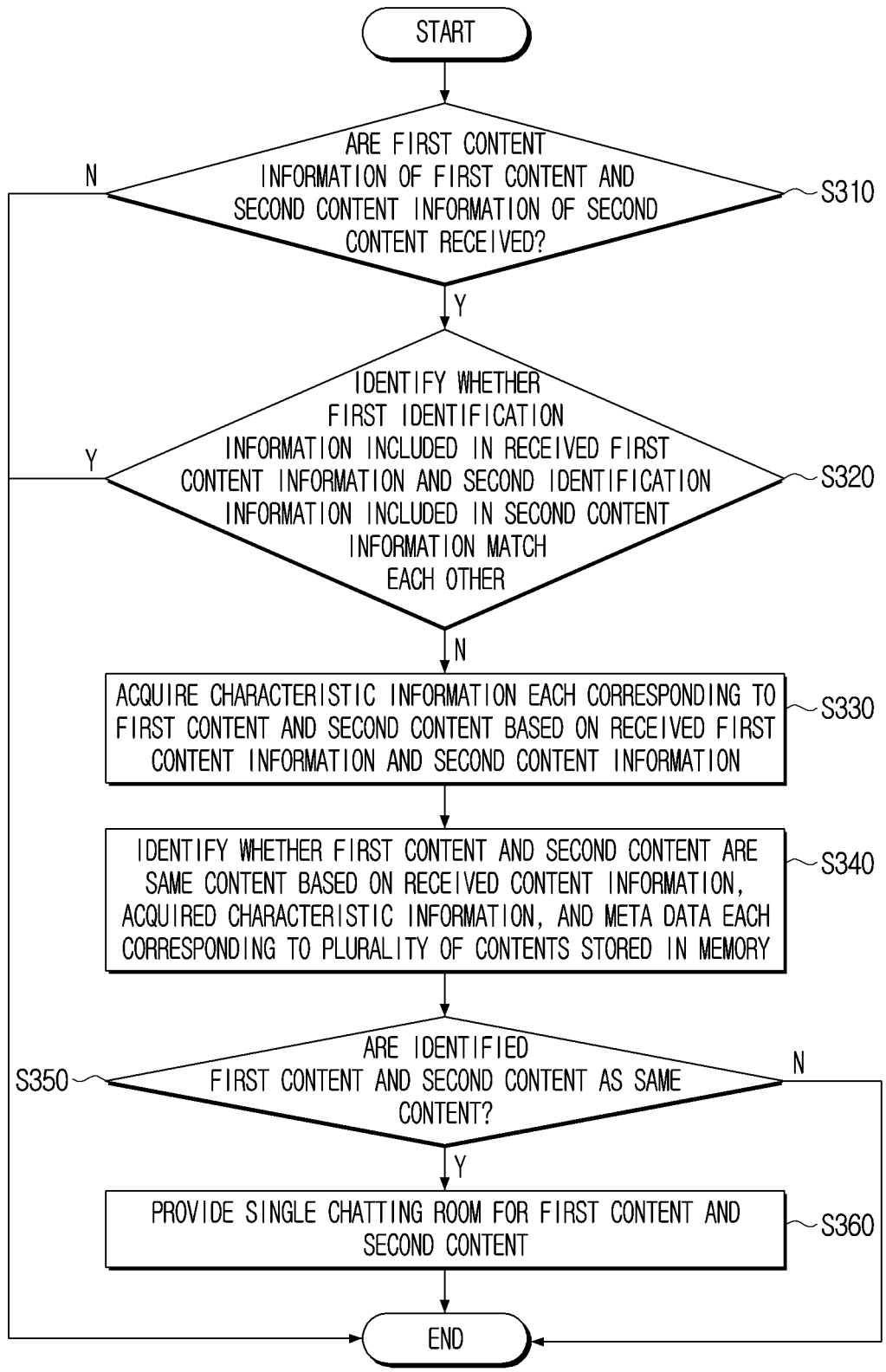
FIG. 3 is a flowchart for explaining the controlling method of an electronic apparatus according to one or more embodiments.

FIG. 3 is a flowchart for explaining the controlling method of an electronic apparatus according to one or more embodiments.

Referring to FIG. 3, the controlling method according to one or more embodiments may include identifying whether the first content information of the first content and the second content information of the second content are received (S310).

Next, in case that the first content information and the second content information are received (S310-Y), the controlling method according to one or more embodiments may include identifying whether the first identification information included in the received first content information and the second identification information included in the second content information match each other (S320). In an example, the processor 130 may compare the first country type information and the first ID information, included in the first identification information, with the second country type information and the second ID information, included in the second identification information, for each corresponding type.

For example, in case that the first country type information corresponding to the first content is 'USA' and the second country type information corresponding to the second content is 'Korea', the processor 130 may identify that the first identification information and the second identification information do not match each other. Alternatively, in case that the first ID information corresponding to the first content and the second ID information corresponding to the second content are different from each other, the processor 130 may identify that the first identification information and the second identification information do not match each other.

Next, in case that the first identification information and the second identification information are identified as not matching each other (S320-N), the controlling method according to one or more embodiments may include acquiring the characteristic information each corresponding to the first content and the second content based on the received first content information and second content information (S330). In an example, the processor 130 may acquire the first fingerprint information of the first content based on the image data included in the first content, and acquire the second fingerprint information of the second content based on the image data included in the second content. The description describes a specific method of acquiring the fingerprint information in detail with reference to FIG. 9.

Next, the controlling method according to one or more embodiments may include identifying whether the first content and the second content are the same content based on the received content information, the identified characteristic information, and the meta data each corresponding to the plurality of contents stored in the memory 120 (S340).

In an example, the processor 130 may first identify whether the acquired first fingerprint information and second fingerprint information have the similarity of the predetermined value or more (e.g., 0.9). Next, in case of identifying that the corresponding information have the similarity of the predetermined value or more, the processor 130 may identify the schedule information corresponding to the ID information included in the identification information based on the information stored in the memory 120. Next, in case that the identified first schedule information of the first content and the identified second schedule information corresponding to the second content match each other, the processor 130 may identify the first content and the second content as the same content.

Next, the controlling method according to one or more embodiments may include identifying whether the first content and the second content are the same content (S350), and in case that the two contents are identified as the same content (S350-Y), the controlling method may include providing the chatting room for the first content and the second content (S360). In an example, the processor 130 may identify at least one device receiving the first content and at least one device receiving the second content as being included in the same group, and provide the single chatting room including at least one device receiving the first content and at least one device receiving the second content.

Accordingly, even in case that the same content broadcast simultaneously in different countries has different country codes or content IDs, the electronic apparatus 100 may identify the same content from the plurality of contents in consideration of the characteristic information of the content, and provide the single chatting room including the devices receiving the same content based thereon.

Figure 4:
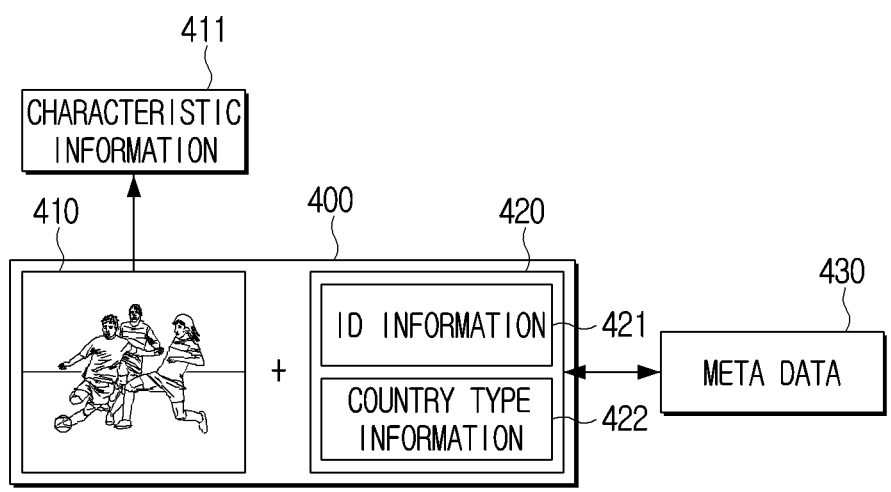
FIG. 4 is a view for explaining content information, characteristic information, and meta data according to one or more embodiments.

FIG. 4 is a view for explaining the content information, the characteristic information, and the meta data according to one or more embodiments.

Referring to FIG. 4, the processor 130 according to one or more embodiments may receive content information 400 including image data 410 and identification information 420 through the communication interface 110. In an example, the image data 410 may be preview image data corresponding to the content, is not limited thereto, and may be image data having a data size having a predetermined size or more.

Meanwhile, the processor 130 according to one or more embodiments may acquire characteristic information 411 corresponding to the content from the image data 410. In an example, the characteristic information may include at least one of the fingerprint information corresponding to the content or the image frame information corresponding to the content. In an example, in case that the image data 410 is the preview image data, the processor 130 may acquire the fingerprint information of the content from the image data based on a predetermined algorithm. In this case, the fingerprint information may be the numerical type information, and is not limited thereto.

Alternatively, in an example, the processor 130 may acquire the image frame information of the content from the received image data 410. For example, in case that the received image data 410 is real-time broadcast data rather than the preview data (or, in case that the content is currently being streamed), the processor 130 may acquire the image frame information at a predetermined time point from the real-time broadcast data. In this case, the image frame information may be the image type information.

That is, in case that the content is yet to be broadcast, the processor 130 may receive the preview data corresponding to the content through the communication interface 110, and acquire the fingerprint information corresponding to the content based thereon. Meanwhile, in case that the content is currently being broadcast, the processor 130 may acquire the image frame information at the predetermined time point from real-time image data. However, the disclosure is not limited thereto. The processor 130 may acquire the image frame information of the content even before the content is broadcast, and acquire the fingerprint information corresponding to the content based on the received image data even in case that the content is broadcasting.

Meanwhile, according to one or more embodiments, the identification information 420 may include at least one of ID information 421 or country type information 422, corresponding to the content. The ID information corresponding to the content may be the numerical type information, is not limited thereto, and in an example, the ID information may be the text information. In an example, the country type information 422 may be received through the communication interface 110 together with the image data corresponding to the content, and for example, the country type information 422 may have the country type information of different values for different countries such as France, Korea, and USA. Alternatively, in an example, the country type information 422 may include different city type information included in a country. For example, there may be a case where cities with different time differences exist even in a single country, and in this case, the different city type information included in the country may be received together with the content.

Meanwhile, according to one or more embodiments, the memory 120 may store meta data 430 each corresponding to the plurality of contents. In an example, the meta data 430 may store the ID information corresponding to the content and the schedule information corresponding to the ID information. In an example, the processor 130 may identify the schedule information corresponding to the received content by comparing the ID information 421 of the content that is received through the communication interface 110 with the ID information stored in the memory 120. The schedule information may be the broadcast time information of the content, and in an example, the schedule information may include the information on the broadcast start time and broadcast end time of the content.

In an example, the processor 130 may identify a type of the received content based on the identified schedule information. Here, the type of the content may be either a real-time broadcast content or a rebroadcast content. For example, in case of identifying that the schedule information of the first content and that of the second content are different from each other even though the fingerprint information of the first content and that of the second content match each other, the processor 130 may identify that a content corresponding to a schedule of an earlier time point is the real-time broadcast content and the other content is the rebroadcast content based on the identified schedule information.

Figure 5:
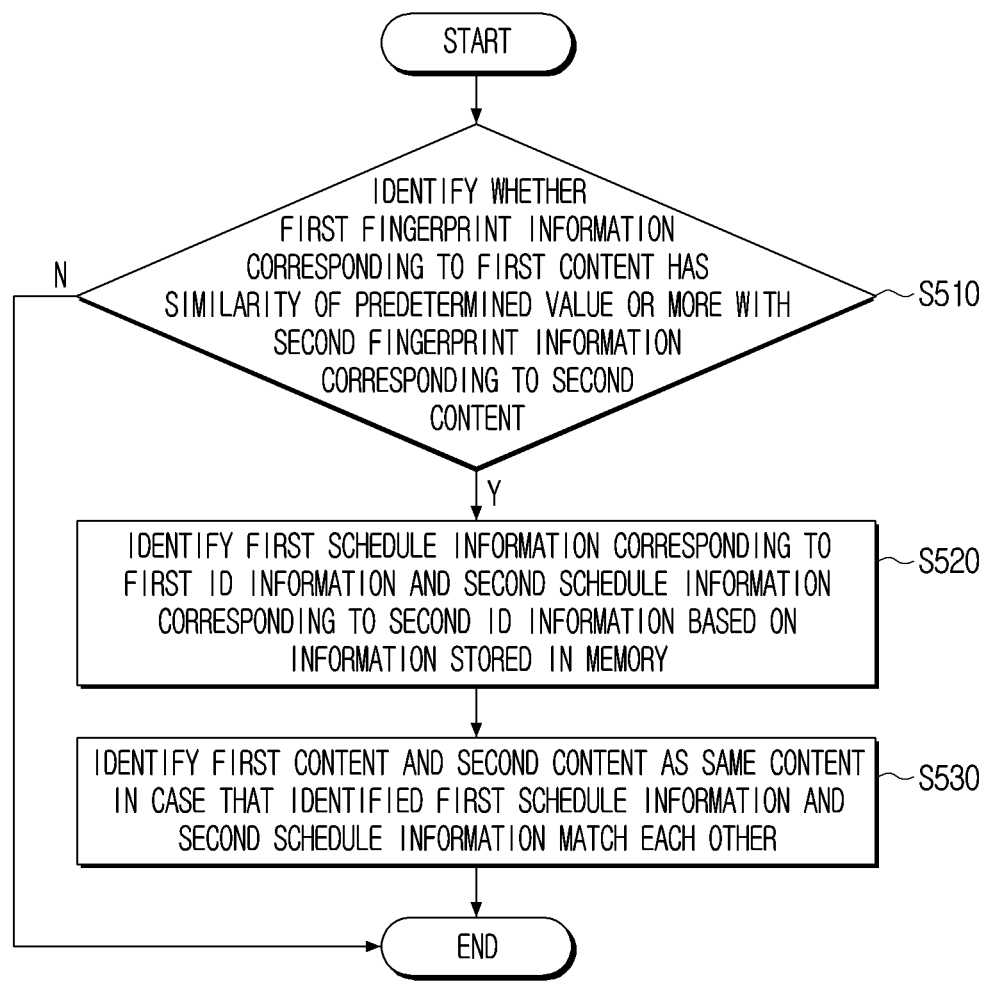
FIG. 5 is a view for explaining a method of identifying whether contents are the same content according to one or more embodiments.

FIG. 5 is a view for explaining a method of identifying whether contents are the same content according to one or more embodiments.

Referring to FIG. 5, the controlling method according to one or more embodiments may first include identifying whether the first fingerprint information corresponding to the first content has the similarity of the predetermined value or more with the second fingerprint information corresponding to the second content (S510). In an example, the processor 130 may compare the first fingerprint information with the second fingerprint information to identify whether the information have the similarity of the predetermined value or more (e.g., 0.90).

Next, in case that it is identified that the information have the similarity of the predetermined value or more (S510-Y), the controlling method according to one or more embodiments may include identifying the first schedule information corresponding to the first ID information and the second schedule information corresponding to the second ID information based on the information stored in the memory 120 (S520). In an example, the memory 120 may store the ID information of the plurality of contents and the schedule information each corresponding to the ID information. The processor 130 may identify the first schedule information corresponding to the received first ID information by identifying the same ID information as the first ID information from the received ID information stored in the memory 120, and identifying the schedule information corresponding to the identified ID information. In addition, the processor 130 may identify the second schedule information corresponding to the received second ID information by identifying the same ID information as the second ID information from the received ID information stored in the memory 120, and identifying the schedule information corresponding to the identified ID information.

Next, the controlling method according to one or more embodiments may include identifying the first content and the second content as the same content in case that the identified first schedule information and second schedule information match each other (S530). In an example, the processor 130 may compare the identified first schedule information with the identified second schedule information to identify that the first schedule information and the second schedule information match each other in case that the first schedule information and the second schedule information match each other. Next, the processor 130 may identify that the first content corresponding to the first schedule information and the second content corresponding to the second schedule information are the same content.

However, the disclosure is not limited thereto, and the processor 130 according to one or more embodiments may identify whether the first schedule information and second schedule information match each other, the first schedule information and second schedule information being updated based on the time difference information stored in the memory 120. This configuration is described below in detail with reference to FIG. 6.

Figure 6:
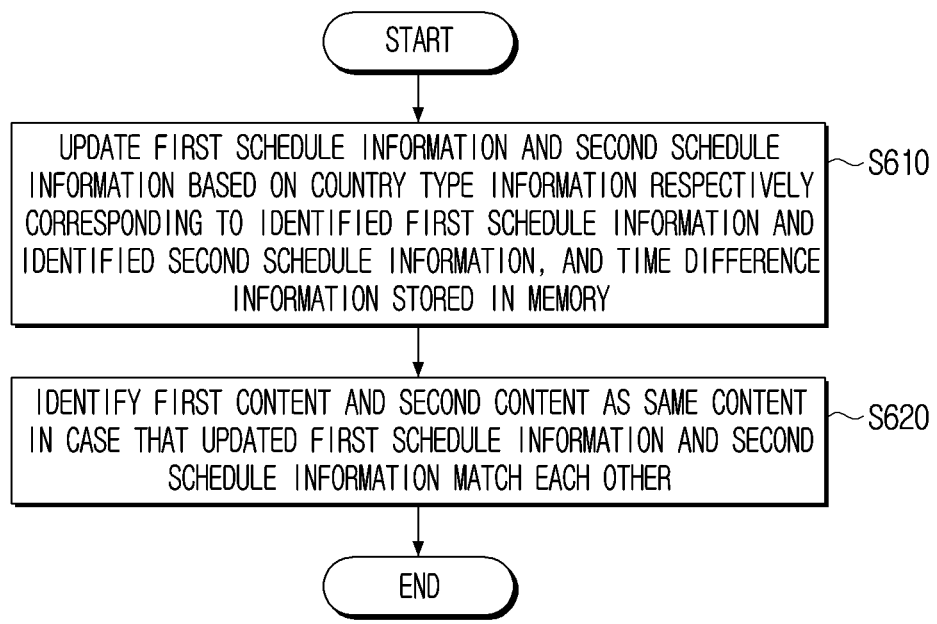
FIG. 6 is a view for explaining a method of identifying whether contents are the same content in consideration of time difference information according to one or more embodiments.

FIG. 6 is a view for explaining a method of identifying whether contents are the same content in consideration of the time difference information according to one or more embodiments.

According to one or more embodiments, the memory 120 may store the time difference information each corresponding to the plurality of country types. Here, time difference may be a difference between local time of two points on the earth, and the time difference information may be information on a magnitude of the time difference corresponding to each of the plurality of country types. According to one or more embodiments, the processor 130 may update the schedule information based on the information stored in the memory 120.

Referring to FIG. 6, the controlling method according to one or more embodiments may include updating the first schedule information and the second schedule information based on the country type information respectively corresponding to the identified first schedule information and the identified second schedule information, and the time difference information stored in the memory 120 (S610).

In an example, assume that the first schedule information corresponding to the first content is "09:00~11:00", and the country type information corresponding to the first content is "A", and the second schedule information corresponding to the second content is "14:00~15:00" and the country type information corresponding to the second content is "B". The processor 130 may identify that the time difference information corresponding to the country "A" is "2:00", and the time difference information corresponding to the country "B" is "−3:00" based on the information stored in the memory 120. The processor 130 may update the first schedule information to "11:00~13:00", and the second schedule information to "11:00~13:00", based thereon.

Next, the controlling method according to one or more embodiments may include identifying the first content and the second content as the same content in case that the updated first schedule information and second schedule information match each other (S620). In an example, the processor 130 may identify the first content and the second content as the same content as the updated first schedule information ("11:00~13:00") and second schedule information ("11:00~13:00") match each other.

Accordingly, even in case that the same content broadcast simultaneously in different countries has the different country codes or content IDs, the electronic apparatus 100 may identify the same content from the plurality of contents by using the fingerprint information and schedule information of the content, and provide the single chatting room including the devices receiving the same content based thereon. Accordingly, the users from different countries may chat in the same chatting room.

Meanwhile, according to one or more embodiments, the processor 130 may receive the country type information including city information, and the memory 120 may store the time difference information corresponding to each city. In an example, the processor 130 may receive the first content information including the country type information corresponding to "USA" and "New York", and receive the second content information including the country type information corresponding to "USA" and "Los Angeles". The memory 120 may store the time difference information corresponding to each of "New York" and "Los Angeles", and the processor 130 may update the schedule information included in the first content information and second content information, based on the information stored in the memory 120.

According to one or more embodiments, the processor 130 may provide a user interface (UI) for selecting any one of the plurality of chatting rooms corresponding to the same content. In an example, assume that a third content and a fourth content among the plurality of contents include the same content, the same corresponding country, and different city information. In case of identifying that the time difference between the third content and the fourth content has the predetermined value or more based on the information stored in memory 120, the processor 130 may provide different chatting rooms for the third content and the fourth content, and transmit, to the device, UI information for selecting one of the different chatting rooms.

For example, assume a case of receiving third content information including the country type information corresponding to "USA" and "New York", and receiving fourth content information including the country type information corresponding to "USA" and "Los Angeles". If the third content and the fourth content are the same as each other, the processor 130 may provide the different chatting rooms for the third content and the fourth content, and transmit, to the device, the UI information for selecting one of the chatting rooms in case of identifying the time difference between the third content and the fourth content has the predetermined value or more based on the information stored in the memory 120.

Accordingly, the electronic apparatus 100 may provide the plurality of types of chatting rooms in case that the chatting rooms belong to different time zones even in the same country. The user may thus select one of the plurality of chatting rooms in consideration of the time difference.

Figure 7:
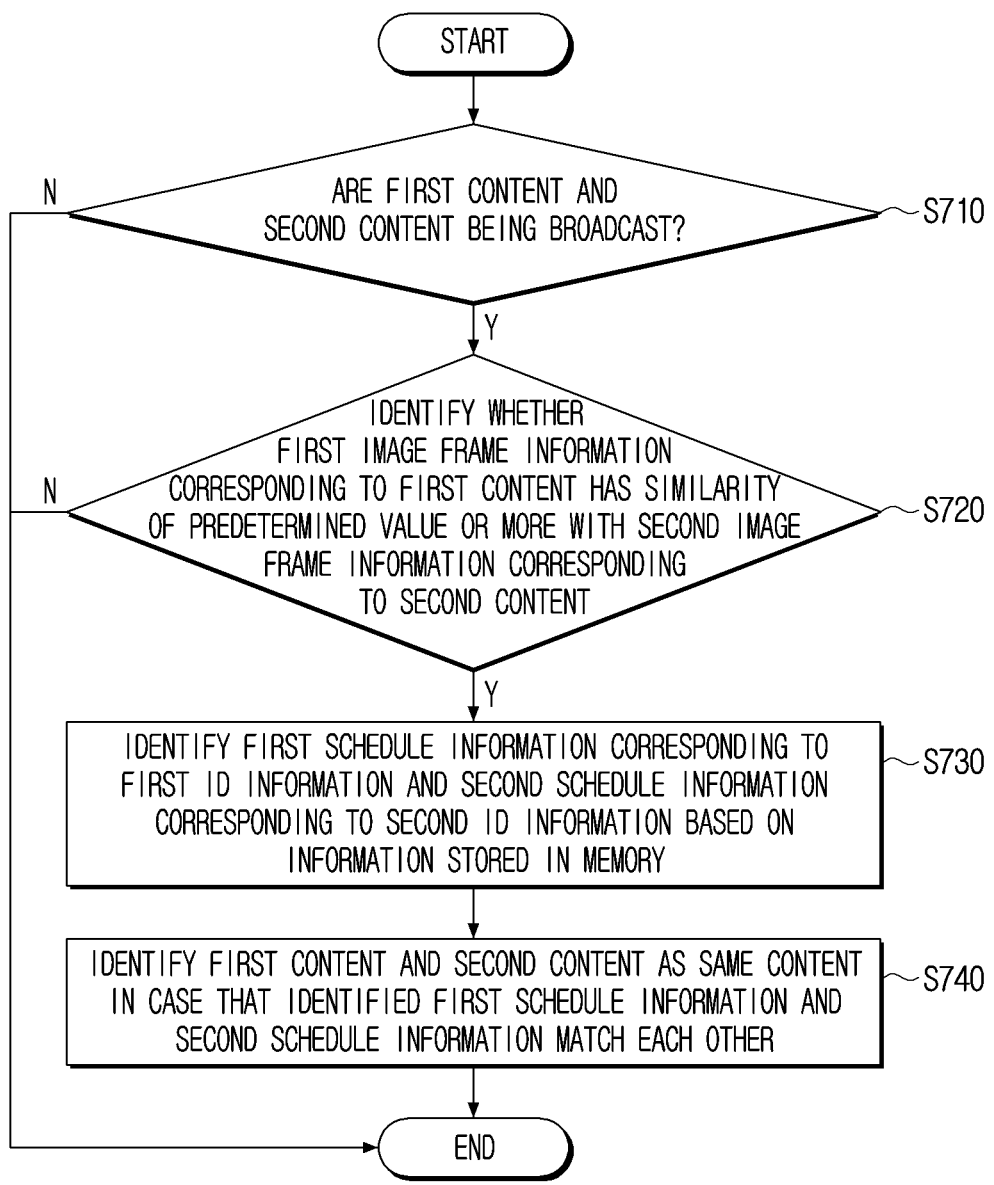
FIG. 7 is a view for explaining a method of identifying whether contents are the same content based on image frame information according to one or more embodiments.

FIG. 7 is a view for explaining a method of identifying whether contents are the same content based on the image frame information according to one or more embodiments.

According to one or more embodiments, the characteristic information may include at least one of the fingerprint information or the image frame information. Meanwhile, according to one or more embodiments, the content information may include the image data each corresponding to the content, and the processor 130 may acquire the characteristic information corresponding to the content by identifying the image frame information corresponding to the content based on the identified image data.

Referring to FIG. 7, the controlling method according to one or more embodiments may first include identifying whether the first content and the second content are being broadcast (S710). In an example, the processor 130 may identify whether the content is being reproduced based on the type of the received content information. For example, in case that the image data included in the received content information is the preview data, the processor 130 may identify the received content as before being broadcast. Alternatively, for example, in case that the image data included in the received content information is the real-time broadcast data, the processor 130 may identify that the received content is currently being broadcast.

Next, in case that the first content and the second content are identified as being reproduced (S710-Y), the controlling method according to one or more embodiments may include identifying whether first image frame information corresponding to the first content has the similarity of the predetermined value or more with second image frame information corresponding to the second content (S720).

In an example, in case that the image data included in the received first content information and the image data included in the received second content information are the real-time broadcast data, the processor 130 may identify that the first content and the second content are being broadcast. Next, the processor 130 may acquire the first image frame information based on the image data corresponding to the received first content, and acquire the second image frame information based on the image data corresponding to the received second content.

In this case, the image frame information may be image frame information corresponding to the image data at the time point at which the image data is received, is not limited thereto, and an image frame output in a predetermined order among the plurality of frames included in the image data may be identified as the image frame information corresponding to the image data.

In an example, the processor 130 may identify whether the acquired first image frame information corresponding to the first content has the similarity of the predetermined value or more with the second image frame information corresponding to the second content. For example, the processor 130 may acquire the similarity by comparing the acquired first and second frame information in units of pixels, and identify whether the first image frame information has the similarity of the predetermined value or more with the second image frame information based thereon.

Next, in case that it is identified that the first image frame information and the second image frame information have the similarity of the predetermined value or more (S720-Y), the controlling method according to one or more embodiments may include identifying the first schedule information corresponding to the first ID information and the second schedule information corresponding to the second ID information based on the information stored in the memory 120 (S730).

Next, the controlling method according to one or more embodiments may include identifying the first content and the second content as the same content in case that the identified first schedule information and second schedule information match each other (S740).

Accordingly, even in case that the content is currently reproduced, the electronic apparatus 100 may identify the same content from the plurality of contents by using the image frame information and schedule information of the content, and provide the single chatting room that includes the devices receiving the same content based thereon.

Figure 8A:
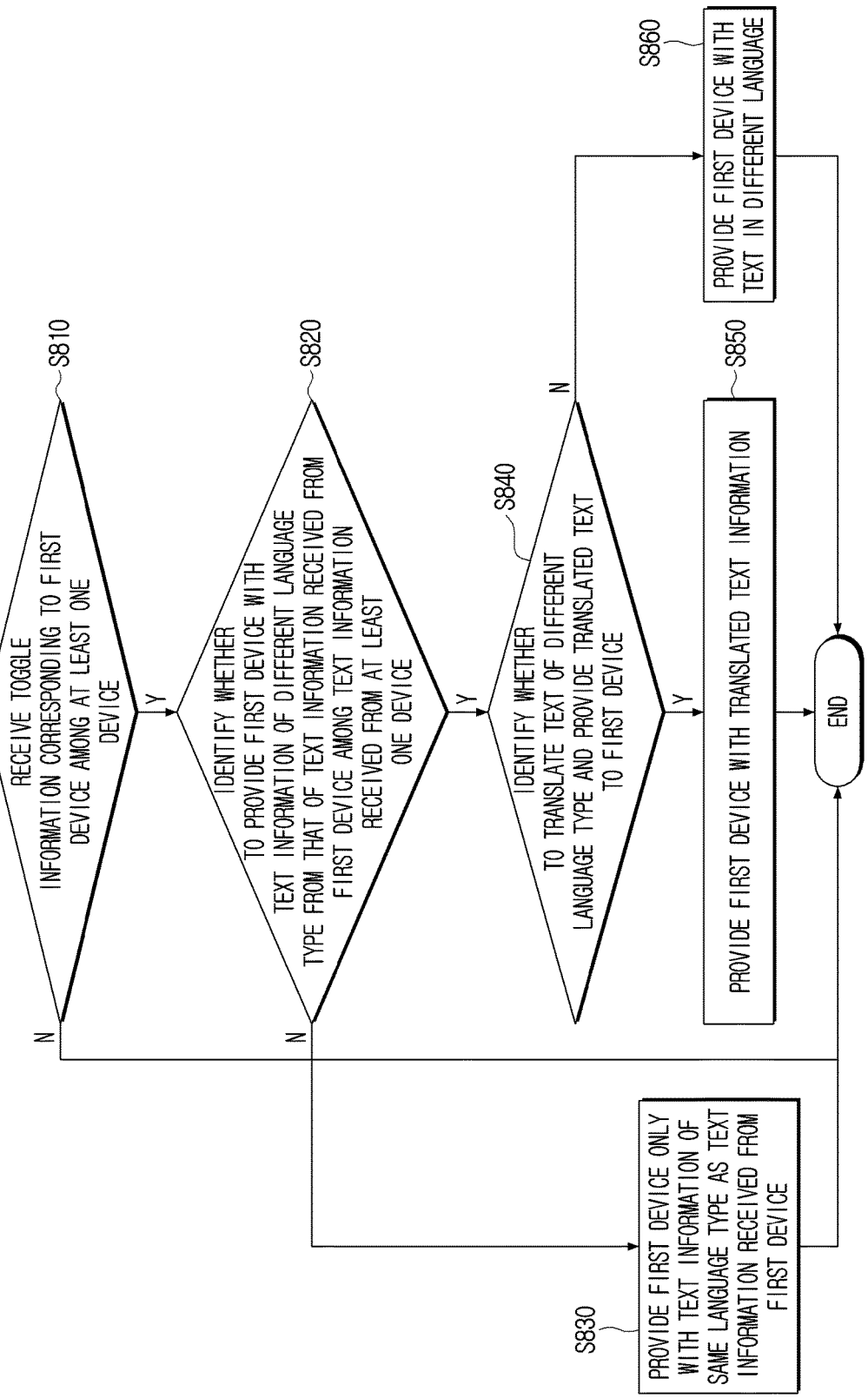
FIGS. 8A and 8B are views for explaining a method of providing a chat service according to one or more embodiments.
Figure 8B:
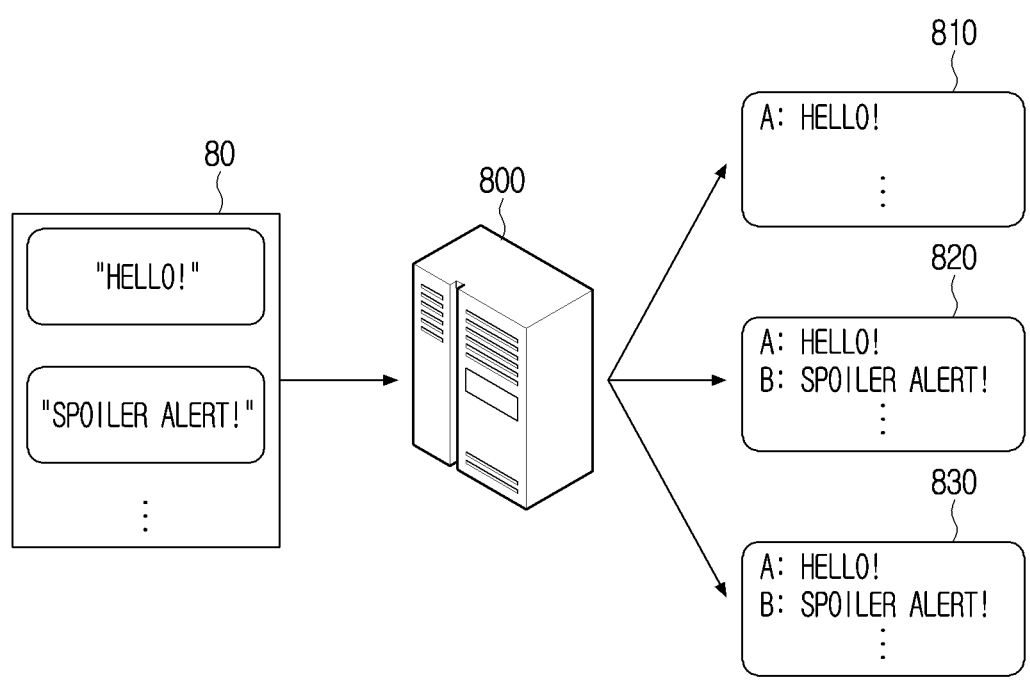

FIGS. 8A and 8B are views for explaining a method of providing the chat service according to one or more embodiments.

According to one or more embodiments, the processor 130 may provide the chat service based on the text information received from at least one device corresponding to the chatting room provided through the communication interface 110 and toggle information each corresponding to at least one device. The text information is text information corresponding to the chat message received from at least one device.

Meanwhile, the toggle information is information on a user command for identifying a type of a text provided to the device. For example, the device may identify whether the user command on whether to receive the text information (or the text) in a language different from that provided by the device is received, and identify toggle information for receiving the text in a language different from that provided by the device in case of receiving the user command corresponding to positive feedback.

Alternatively, the device may identify whether the user command on whether to perform translation for the received text in a different language is received, for example, in case of receiving the positive feedback on whether to receive the text in a language different from that provided by the device. The device may identify toggle information for receiving the translated text in case of receiving the user command corresponding to the positive feedback from the user.

Referring to FIG. 8A, the controlling method according to one or more embodiments may first include identifying whether toggle information corresponding to the first device among at least one device is received (S810).

In an example, the processor 130 may receive the toggle information from the first device among at least one device corresponding to the provided chatting room. In this case, the toggle information may include toggle information on whether to receive the text in a language different from that provided by the device and the toggle information on whether to receive the translated text.

Next, in case that the toggle information is received (S810-Y), the controlling method according to one or more embodiments may include identifying whether to provide the first device with the text information of a different language type from that of the text information received from the first device among the text information received from at least one device (S820). In an example, in case of receiving the toggle information for receiving the text in a language different from that provided by the first device, the processor 130 may provide the first device with the text of a different language from the text received from the first device among the text received from at least one device.

In case that it is identified that the text information of the different language type is not provided to the first device (S820-N), the controlling method according to one or more embodiments may include providing the first device only with text information of the same language type as the text information received from the first device (S830). In an example, in case of receiving the toggle information for not receiving the text in a language different from that provided by the first device, the processor 130 may provide the first device with only the text in the same language as the text received from the first device among the text received from at least one device.

Meanwhile, in case that it is identified that the text of the different language type is provided to the first device (S820-Y), the controlling method according to one or more embodiments may include identifying whether to translate the text of the different language type and provide a translated text to the first device (S840). In an example, in case of receiving the toggle information on whether to receive the translated text from the first device, the processor 130 may identify whether to translate the text in a language different from a language corresponding to the first device among the text received from at least one device and provide the translated text to the first device based thereon.

In case that it is identified that the text in a different language is translated and provided to the first device (S840-Y), the controlling method according to one or more embodiments may include providing the first device with the translated text information (S850). Meanwhile, in case that it is identified that the text in a different language is provided to the first device without translation (S840-N), the controlling method according to one or more embodiments may include providing the first device with the text in a different language (S860).

In an example, the processor 130 may first translate the text received from at least one device corresponding to the chatting room into the text in a different language and store the text. For example, in case that the received text is Korean text, the processor 130 may translate the received text into different types of languages including English and French, and store the same. In case of receiving the toggle information for receiving the translated text from the first device through the communication interface 110, the processor 130 may identify the text in the language corresponding to the first device from a pre-stored text based on the information stored in the memory 120 and provide the same to the first device. For example, in case that the language corresponding to the first device is Korean, the processor 130 may provide the first device with the text received from at least one device and translated into Korean through the communication interface 110 based on the information stored in the memory 120.

Meanwhile, in an example, in case of identifying that the text of a different language is provided to the first device without translation, the processor 130 may provide the first device with the text in a different language received from at least one device corresponding to the chatting room.

Accordingly, in case that the users from different countries who watch the same content chat in the same chatting room, the electronic apparatus 100 may provide the chat service in consideration of the characteristics of each user, thus increasing user satisfaction.

Referring to FIG. 8B, according to one or more embodiments, the processor 130 may receive text information (or text) 80 from the external device (not shown). In an example, the processor 130 may receive a Korean text corresponding to "Hello!" from the first device among at least one device corresponding to the single chatting room, and receive an English text corresponding to "Spoiler Alert!" from the second device among at least one device corresponding to the single chatting room.

According to one or more embodiments, the processor 130 may provide the text information to at least one device corresponding to the chatting room based on the received at least one type of the toggle information. In an example, the processor 130 may provide the text information (or the text) to the first device based on at least one of the toggle information on whether to receive the text in a language different from that provided by the first device and the toggle information on whether to receive the translated text.

For example, in case of receiving the toggle information for not receiving the text in a language different from Korean, which is the language provided by the first device, the processor 130 may provide text information 810 to the first device by excluding the text corresponding to "Spoiler Alert!", which is a language different from Korean which is the language provided by the first device.

Alternatively, for example, the processor 130 may receive, from the first device, the toggle information for receiving the text in a language different from Korean which is the language provided by the first device, and the toggle information for receiving the text translated into Korean which is the language provided by the first device. In this case, the processor 130 may provide the first device with text information 820 including "Spoiler Alert (in Korean)!", which is a text translated from "Spoiler Alert!", which is a language different from Korean which is provided by the first device. In this case, the translated text may be pre-stored in the memory 120.

Alternatively, for example, the processor 130 may receive the toggle information for receiving the text in a language different from Korean which is the language provided by the first device, and the toggle information for receiving the text translated into Korean which is the language provided by the first device. In this case, the processor 130 may provide the first device with text information 830 including an untranslated text of "Spoiler Alert!", which is a language different from Korean which is the language provided by the first device.

Returning to FIG. 2, according to one or more embodiments, the processor 130 may provide the chat service based on communication state information. Here, the communication state information may include at least one of a type of a transmitted and received signal (for example, a digital signal or an analog signal) or information on a method of transmitting and receiving a signal (for example, a method of transmitting and receiving a signal by using a satellite or a method of transmitting and receiving a signal by using a cable).

In an example, the processor 130 may provide the chat service based on the received communication state information in case of receiving the communication state information each corresponding to at least one device from at least one device corresponding to the provided chatting room. In an example, the memory 120 may store delay information corresponding to a communication state, and the delay information may here be information on at least one of the magnitude or ratio of time in which the transmitted/received signal is delayed based on the communication state. For example, the processor 130 may identify communication state information of the first device based on the received text, and identify, as delay information of the first device, the delay information corresponding to the communication state information identified based on the information stored in the memory 120. Next, the processor 130 may preferentially provide the text by an amount of the identified delay time to the first device among at least one device corresponding to the chatting room.

Meanwhile, according to one or more embodiments, the processor 130 may acquire and store the meta data each corresponding to the plurality of contents from the external device through the communication interface 110. In an example, the processor 130 may acquire and store the meta data each corresponding to the plurality of contents from the external device including the external server (not shown) through the communication interface 110. However, the disclosure is not limited thereto, and in case of receiving the ID information and the schedule information each corresponding to the plurality of contents from the plurality of the external servers (not shown), the processor 130 may map the ID information and the schedule information corresponding to the plurality of contents and store the same in the memory 120.

Meanwhile, according to one or more embodiments, the processor 130 may provide the chatting room based on channel information each corresponding to the plurality of contents. Here, the channel information may be type information of a broadcasting channel on which the content is currently broadcast or is scheduled to be broadcast. In an example, the processor 130 may provide the chatting room including the channel information corresponding to the chatting room based on the channel information each corresponding to the plurality of contents received from the external device through the communication interface 110. In this case, the processor 130 may receive the meta data each corresponding to the plurality of contents and the channel information corresponding to the plurality of contents from the external device through the communication interface 110, respectively.

Figure 9:
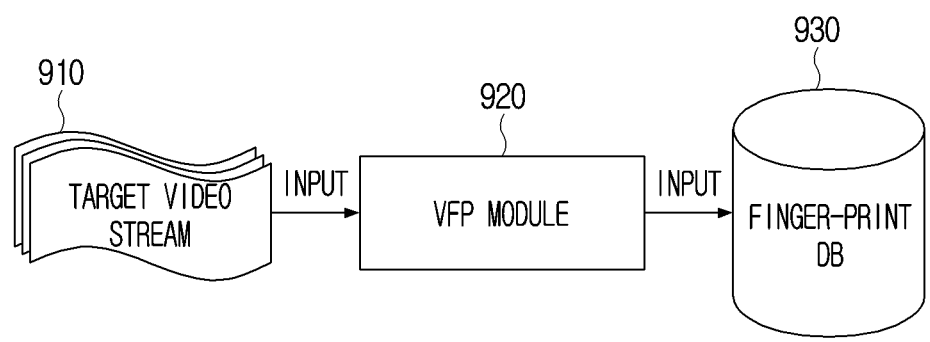
FIG. 9 is a view for explaining a method of acquiring fingerprint information according to one or more embodiments.

FIG. 9 is a view for explaining a method of acquiring the fingerprint information according to one or more embodiments.

Referring to FIG. 9, according to one or more embodiments, the processor 130 may acquire the fingerprint information based on the acquired content information.

In an example, the processor 130 may acquire the fingerprint information of the acquired content by inputting image data 910 (or a target video stream) of the content included in the acquired content information to a video finger-printing (VFP) module. In this case, the image data 910 may include the plurality of image frames.

In an example, in case of receiving the image data 910 including the plurality of image frames, a VFP module 920 may first group the plurality of acquired image frames into a plurality of groups. For example, the VFP module 920 may identify an image frame having similarity of a predetermined value or more with a first image frame from the plurality of acquired image frames, and group the same into a first group.

Next, the VFP module 920 may extract a key frame from each of the plurality of groups including the first group, and output the fingerprint information including information on the plurality of extracted key frames. The processor 130 may acquire the fingerprint information output from the VFP module 920.

In an example, the processor 130 may store the acquired fingerprint information and the content information corresponding to the fingerprint information in the memory 120. For example, the processor 130 may acquire a fingerprint database 930 to which the content information (for example, the ID information of the content or the title information of the content) corresponding to the acquired fingerprint information is mapped, and store the same in the memory 120.

In an example, in case of receiving the image data, the processor 130 may acquire the fingerprint information of the received image data by inputting the same to the VFP module, and acquire the content information matching the acquired fingerprint based on the fingerprint database 930 stored in the memory 120. Accordingly, the processor 130 may acquire the content information of the acquired image data.

Figure 10:
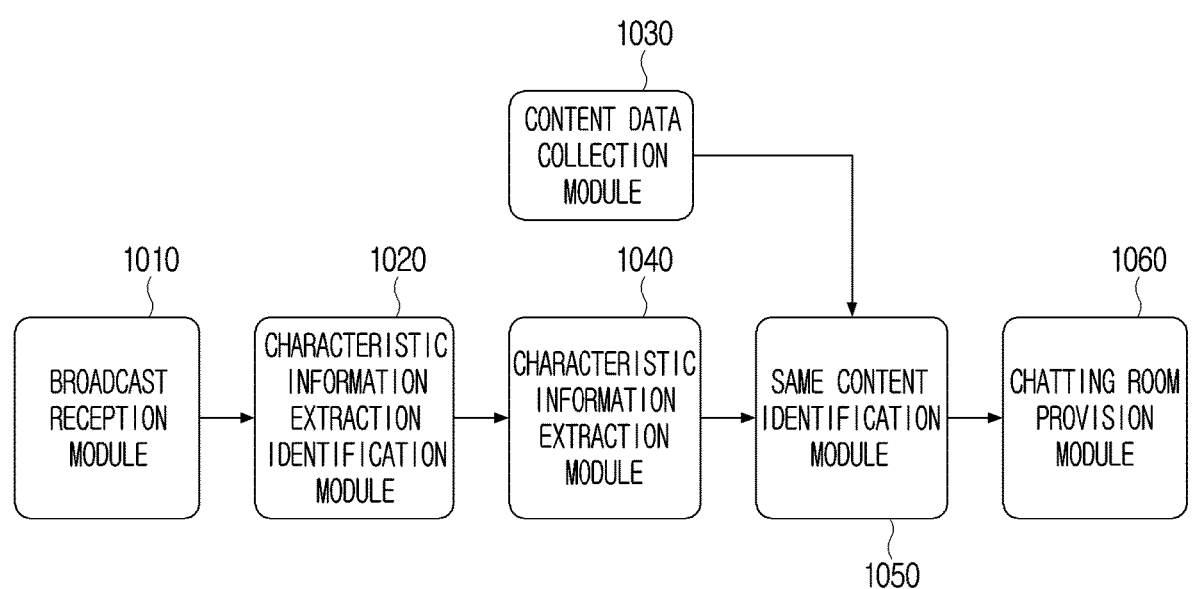
FIG. 10 is a view for explaining a method of providing a chatting room according to one or more embodiments.

FIG. 10 is a view for explaining a method of providing the chatting room according to one or more embodiments.

Referring to FIG. 10, according to one or more embodiments, the electronic apparatus 100 may include a broadcast reception module 1010, a characteristic information extraction identification module 1020, a content data collection module 1030, a characteristic information extraction module 1040, a same content identification module 1050, and a chatting room provision module 1060.

First, the broadcast reception module 1010 may receive at least one broadcast content from the external device (not shown) through the communication interface 110. In this case, the broadcast content may include the same content broadcast in different countries, and in an example, the broadcast reception module 1010 may also receive the content information corresponding to the broadcast content. The characteristic information extraction identification module 1020 may identify whether to extract the characteristic information of the received broadcast content based on the received broadcast content and the content information corresponding thereto. For example, the characteristic information extraction identification module 1020 may identify whether the first identification information and the second identification information match each other based on the first identification information corresponding to the first content and the second identification information corresponding to the second content, the first content and the second content being included in the plurality of contents, and identify whether to extract the characteristic information.

Meanwhile, the content data collection module 1030 may collect the meta data each corresponding to the plurality of contents. In an example, the content data collection module 1030 may map the ID information each corresponding to the plurality of contents received through the communication interface 110 and the schedule information corresponding thereto, and store the same in the memory 120.

In case of identifying that the characteristic information is to be extracted through the characteristic information extraction identification module 1020, the characteristic information extraction module 1040 may extract the characteristic information (e.g., fingerprint information) from the image data included in the acquired content information.

The same content identification module 1050 may identify the same content from the plurality of received contents based on the meta data acquired through the content data collection module 1030 and the characteristic information acquired through the characteristic information extraction module 1040. For example, in case of acquiring the first fingerprint information corresponding to the first content among the plurality of contents and the second fingerprint information corresponding to the second content among the plurality of contents through the characteristic information extraction module 1040, the same content identification module 1050 may identify whether the first fingerprint information and the second fingerprint information have the similarity of the predetermined value or more. In case of identifying that the first fingerprint information and the second fingerprint information have the similarity of the predetermined value or more, the same content identification module 1050 may identify that the first schedule information corresponding to the first ID information and the second schedule information corresponding to the second ID information based on the meta data acquired through the content data collection module 1030. In case that the identified first schedule information and second schedule information match each other, the same content identification module 1050 may identify the first content and the second content as the same content.

In case of identifying the first content and the second content as the same content through the same content identification module 1050, the chatting room provision module 1060 may provide the single chatting room for the first content and the second content. For example, the chatting room provision module 1060 may group at least one device receiving the first content and at least one device receiving the second content into the same group, and provide the chat service for a plurality of grouped devices.

Figure 11:
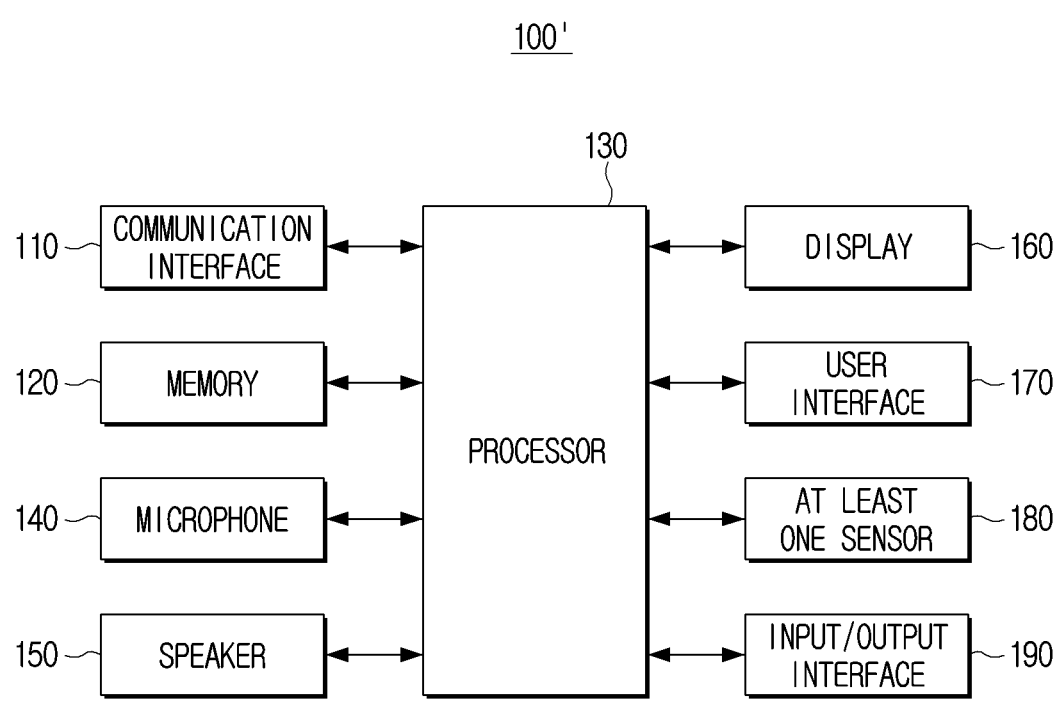
FIG. 11 is a block diagram showing a detailed configuration of an electronic apparatus according to one or more embodiments.

FIG. 11 is a block diagram showing a detailed configuration of an electronic apparatus according to one or more embodiments.

Referring to FIG. 11, an electronic apparatus 100' may include a communication interface 110, a memory 120, at least one processor 130, a microphone 140, a speaker 150, a display 160, a user interface 170, and at least one sensor 180. The description omits detailed descriptions of components overlapping the components shown in FIG. 2 among the components shown in FIG. 11.

The microphone 140 may be a module acquiring sound and converting the same into an electrical signal, and may be a condenser microphone, a ribbon microphone, a moving coil microphone, a piezoelectric element microphone, a carbon microphone, or a micro electro mechanical system (MEMS) microphone. In addition, the microphone may be implemented using a non-directional method, a bi-directional method, a uni-directional method, a sub-cardioid method, a super-cardioid method, or a hyper-cardioid method.

There may be various embodiments in which the electronic apparatus 100' performs an operation corresponding to the user voice signal received through the microphone 140.

For example, the electronic apparatus 100' may control the display 160 based on the user voice signal received through the microphone 140. For example, in case of receiving the user voice signal for displaying a content A, the electronic apparatus 100' may control the display 160 to display the content A.

For another example, the electronic apparatus 100' may control an external display device connected to the electronic apparatus 100' based on the user voice signal received through the microphone 140. In detail, the electronic apparatus 100' may provide a control signal for controlling the external display device so that the external display device performs an operation corresponding to the user voice signal, and transmit the provided control signal to the external display device. Here, the electronic apparatus 100' may store a remote control application for controlling the external display device. In addition, the electronic apparatus 100' may transmit the provided control signal to the external display device by using at least one communication method of the Bluetooth, the Wi-Fi, or an infrared ray. For example, in case of receiving the user voice signal for displaying the content A, the electronic apparatus 100' may transmit, to the external display device, the control signal for controlling the content A to be displayed on the external display device. Here, the electronic apparatus 100' may be any of various terminal devices which may install the remote control application such as a smartphone or an artificial intelligence (AI) speaker.

For another example, the electronic apparatus 100' may use a remote control device to control the external display device connected to the electronic apparatus 100' based on the user voice signal received through the microphone 140. In detail, the electronic apparatus 100' may provide the control signal for controlling the external display device so that the external display device performs an operation corresponding to the user voice signal, and transmit the provided control signal to the external display device. In addition, the remote control device may transmit the control signal received from the electronic apparatus 100' to the external display device. For example, in case of receiving the user voice signal for displaying the content A, the electronic apparatus 100' may transmit, to the remote control device, the control signal for controlling the content A to be displayed on the external display device, and the remote control device may transmit the received control signal to the external display device.

The speaker 150 may include a tweeter for high-pitched sound reproduction, a midrange for mid-range sound reproduction, a woofer for low-pitched sound reproduction, a subwoofer for extremely low-pitched sound reproduction, an enclosure for controlling resonance, a crossover network that divides a frequency of the electrical signal input to the speaker for each band, or the like.

The speaker 150 may output a sound signal to outside the electronic apparatus 100'. The speaker 150 may output multimedia reproduction, recording reproduction, various notification sounds, a voice message, or the like. The electronic apparatus 100' may include an audio output device such as the speaker 150, or an output device such as an audio output terminal. In particular, the speaker 150 may provide acquired information, processed/produced information based on the acquired information, a response result to the user voice, an operation result to the user voice, or the like, in the form of a voice.

The display 160 may be implemented as a display including a self-light emitting element or a display including a non self-light emitting element and a backlight. For example, the display 160 may be implemented in various types of displays such as a liquid crystal display (LCD), an organic light emitting diode (OLED) display, a light emitting diode (LED) display, a micro light emitting diode (micro LED) display, a mini LED display, a plasma display panel (PDP), a quantum dot (QD) display, a quantum dot light-emitting diode (QLED) display. The display 160 may also include a driving circuit, a backlight unit and the like, which may be implemented in a form such as an a-si thin film transistor (TFT), a low temperature poly silicon (LTPS) TFT, or an organic TFT (OTFT). Meanwhile, the display 160 may be implemented as a touch screen combined with a touch sensor, a flexible display, a rollable display, a three-dimensional (3D) display, a display in which a plurality of display modules are physically connected with each other, or the like. The processor 130 may control the display 160 to output an acquired output image according to the various embodiments described above. Here, the output image may be a high-resolution image of 4K, 8K or higher.

Meanwhile, in another example, the electronic apparatus 100' may not include the display 160. The electronic apparatus 100' may be connected to the external display device, and the image or the content, stored in the electronic apparatus 100', may be transmitted to the external display device. In detail, the electronic apparatus 100' may transmit the image or the content to the external display device together with the control signal for controlling the image or the content to be displayed on the external display device.

Here, the external display device may be connected to the electronic apparatus 100' through the communication interface 110 or an input/output interface 190. For example, the electronic apparatus 100' may not include the display like a set top box (STB). In addition, the electronic apparatus 100' may include only a small display which may only display simple information such as the text information. Here, the electronic apparatus 100' may transmit the image or the content to the external display device in the wired or wireless manner through the communication interface 110, or transmit the image or the content to the external display device through the input/output interface 190.

The user interface 170 is a component for the electronic apparatus 100' to perform interaction with the user. For example, the user interface 170 may include at least one of a touch sensor, a motion sensor, a button, a jog dial, a switch, a microphone, or a speaker, and is not limited thereto.

At least one sensor 180 (hereinafter referred to as a sensor) may include a plurality of sensors of various types. The sensor 180 may measure a physical quantity of the electronic apparatus 100' or detect its operation state, and convert the measured or detected information into an electrical signal. The sensor 180 may include a camera, and the camera may include a lens that focuses visible light and other optical signals received after being reflected by an object to an image sensor, and the image sensor which may detect visible light and other optical signals. Here, the image sensor may include a two-dimensional (2D) pixel array divided into a plurality of pixels.

The input/output interface 190 may be any of a high definition multimedia interface (HDMI), a mobile high-definition link (MHL), a universal serial bus (USB), a display port (DP), a thunderbolt, a video graphics array (VGA) port, a red-green-blue (RGB) port, a D-subminiature (D-SUB), or a digital visual interface (DVI). The input/output interface 190 may input/output at least one of audio or video signals. The input/output interface 190 may include a port for inputting and outputting only an audio signal and a port for inputting and outputting only a video signal as its separate ports, or may be implemented as a single port for inputting and outputting both the audio signal and the video signal. Meanwhile, the electronic apparatus 100' may transmit at least one of the audio and video signals to the external device (for example, the external display device or an external speaker) through the input/output interface 190. In detail, an output port included in the input/output interface 190 may be connected to the external device, and the electronic apparatus 100' may transmit at least one of the audio or video signals to the external device through the output port.

According to the various embodiments described above, the electronic apparatus may identify the same content from the plurality of contents in consideration of the characteristic information of each of the plurality of received contents, provide the single chatting room for the devices corresponding to the same content, and provide the chat service in consideration of the characteristics of each device included in the provided chatting room. As a result, the electronic apparatus may improve the user satisfaction.

Meanwhile, the methods according to the various embodiments of the disclosure described above may be implemented in the form of an application which may be installed on a conventional electronic apparatus. Alternatively, the methods according to the various embodiments of the disclosure described above may be performed using a deep learning-based trained neural network (or deep trained neural network), that is, the learning network model. In addition, the methods according to the various embodiments of the disclosure described above may be implemented only by software upgrade or hardware upgrade of the conventional electronic apparatus. In addition, the various embodiments of the disclosure described above may be performed through an embedded server included in the electronic apparatus, or an external server of the electronic apparatus.

Meanwhile, according to one or more embodiments of the disclosure, one or more embodiments described above may be implemented in software including an instruction stored in a machine-readable storage medium (for example, a computer-readable storage medium). A machine may be a device that invokes the stored instruction from a storage medium, may be operated based on the invoked instruction, and may include the display device (e.g., display device A) according to the disclosed embodiments. In case that the instruction is executed by the processor, the processor may directly perform a function corresponding to the instruction, or other components may perform the function corresponding to the instruction under a control of the processor. The instruction may include codes generated or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

In addition, according to one or more embodiments of the disclosure, the methods according to the various embodiments described above may be included and provided in a computer program product. The computer program product may be traded as a product between a seller and a purchaser. The computer program product may be distributed in a form of the machine-readable storage medium (for example, a compact disc read only memory (CD-ROM)), or may be distributed online through an application store (for example, PlayStore™) In case of the online distribution, at least a part of the computer program product may be at least temporarily stored or temporarily provided in a storage medium such as a memory of a server of a manufacturer, a server of an application store or a relay server.

In addition, each component (e.g., module or program) in one or more embodiments described above may include a single entity or a plurality of entities, and some of the corresponding sub-components described above may be omitted or other sub-components may be further included in one or more embodiments. Alternatively or additionally, some of the components (e.g., modules or programs) may be integrated into one entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

Although the embodiments of the disclosure are shown and described hereinabove, the disclosure is not limited to the above-mentioned specific embodiments, and may be variously modified by those skilled in the art to which the disclosure pertains without departing from the scope and spirit of the disclosure as disclosed in the accompanying claims. These modifications should also be understood to fall within the scope and spirit of the disclosure.

What is claimed is:

1. An electronic apparatus comprising:
    a communication interface;
    a memory to store meta data corresponding, respectively, to a plurality of contents including a first content and a second content; and
    at least one processor configured to:
        acquire characteristic information corresponding to the first content and the second content, respectively, based on first content information of the first content and second content information of the second content received through the communication interface, provided the first content information of the first content and the second content information of the second content do not match each other;
        provide a chatting room for the first content and the second content provided the first content and the second content are a same content based on the received first content information and the second content information, the acquired characteristic information, and the meta data stored in the memory,
    wherein the meta data includes at least one of identification (ID) information or schedule information corresponding to the plurality of contents, respectively, the first content information and second content information including at least one of country type information or the ID information corresponding to the first content and the second content, respectively; and
    the at least one processor is further configured to identify whether the first content information and the second content information are matched each other by comparing first country type information and first ID information, included in the first content information, with second country type information and second ID information, included in the second content information.

2. The electronic apparatus as claimed in claim 1, wherein the characteristic information includes at least one of fingerprint information corresponding to the first content and the second content or image frame information corresponding to the first content and the second content, and the at least one processor is configured to: identify the first content and the second content as the same content based on first schedule information corresponding to the first ID information and second schedule information corresponding to the second ID information, identified based on information stored in the memory, match each other based on first fingerprint information corresponding to the first content having similarity of equal to or more than a predetermined value with second fingerprint information corresponding to the second content.

3. The electronic apparatus as claimed in claim 2, wherein the memory further includes time difference information corresponding to a plurality of types included the country type information, and the at least one processor is configured to identify the first content and the second content as the same content based on the first schedule information and the second schedule information matching each other, the first schedule information and the second schedule information being updated based on the country type information corresponding to the identified first schedule information and the identified second schedule information and the time difference information stored in the memory.

4. The electronic apparatus as claimed in claim 2, wherein the content information includes image data corresponding to the first content and the second content, respectively, and the at least one processor is configured to: identify the first content and the second content as the same content based on the first schedule information corresponding to the first ID information and the second schedule information corresponding to the second ID information, and based on first image frame information acquired based on the image data corresponding to the first content and second image frame information acquired based on the image data corresponding to the second content having the similarity of equal to or more than the predetermined value being matched each other.

5. The electronic apparatus as claimed in claim 1, wherein the at least one processor is configured to provide a chat service based on text information received from at least one device corresponding to the chatting room provided through the communication interface and toggle information corresponding to the at least one device.

6. The electronic apparatus as claimed in claim 5, wherein the at least one processor is configured to identify whether to translate the text information of a different language type based on first toggle information and provide a translated text to a first device based on the first device having the text information of the different language type from that of text information received from the first device among the text information received from the at least one device based on the received first toggle information based on receiving toggle information.

7. The electronic apparatus as claimed in claim 5, wherein the at least one processor is configured to provide the chat service based on received communication state information based on the communication state information corresponding to the at least one device being received from the at least one device corresponding to the provided chatting room.

8. The electronic apparatus as claimed in claim 1, wherein the at least one processor is configured to provide the chatting room including channel information corresponding to the chatting room based on the channel information each corresponding to the plurality of contents received from an external server through the communication interface.

9. The electronic apparatus as claimed in claim 1, wherein the at least one processor is configured to acquire and store the meta data each corresponding to the plurality of contents from an external server through the communication interface.

10. A controlling method of an electronic apparatus, comprising:

acquiring characteristic information corresponding to a first content and a second content, respectively, based on first content information of the first content and second content information of the second content, provided the first content information of the first content and the second content information of the second content among a plurality of contents including the first content and the second content do not match each other; and providing a chatting room for the first content and the second content provided the first content and the second content are a same content based on the first content information and the second content information, the acquired characteristic information, and meta data each corresponding to the plurality of contents stored in a memory;

wherein the meta data includes at least one of identification (ID) information or schedule information corresponding to the plurality of contents, respectively, the first content information and second content information including at least one of country type information or the ID information corresponding to the first content and the second content, respectively, and the acquiring of the characteristic information includes identifying whether the first content information and the second content information are matched each other by comparing first country type information and first ID information, included in the first content information, with second country type information and second ID information, included in the second content information.

11. The controlling method as claimed in claim 10, wherein the characteristic information includes at least one of fingerprint information corresponding to the first content and the second content or image frame information corresponding to the first content and the second content, and the providing of the chatting room includes identifying the first content and the second content as the same content based on first schedule information corresponding to the first ID information and second schedule information corresponding to the second ID information, identified based on the information stored in the memory, match each other based on first fingerprint information corresponding to the first content having similarity of equal to or more than a predetermined value with second fingerprint information corresponding to the second content.

12. The controlling method as claimed in claim 11, wherein the memory further includes time difference information each corresponding to a plurality of country types included the country type information, and in the controlling method, the first content and the second content are identified as the same content based on the first schedule information and the second schedule information matching each other, the first schedule information and the second schedule information being updated based on the country type information corresponding to the identified first schedule information and the identified second schedule information and the time difference information stored in the memory.

13. The controlling method as claimed in claim 11, wherein the content information includes image data corresponding to the first content and the second content, respectively, and the providing of the chatting room includes identifying the first content and the second content as the same content based on the first schedule information corresponding to the first ID information and the second schedule information corresponding to the second ID information, and based on first image frame information acquired based on the image data corresponding to the first content and second image frame information acquired based on the image data corresponding to the second content having the similarity of equal to or more than the predetermined value being matched each other.

14. The controlling method as claimed in claim 10, further comprises providing a chat service based on text information received from at least one device corresponding to the chatting room provided through a communication interface and toggle information corresponding to the at least one device.

15. The controlling method as claimed in claim 14, wherein the providing the chat service includes identifying whether to translate the text information of a different language type based on first toggle information and provide a translated text to a first device based on the first device having the text information of the different language type from that of text information received from the first device among the text information received from the at least one device based on the received first toggle information based on receiving toggle information.

16. The controlling method as claimed in claim 14, further comprises:
providing the chat service based on received communication state information based on the communication state information corresponding to the at least one device being received from the at least one device corresponding to the provided chatting room.

17. The controlling method as claimed in claim 10, wherein the providing of the chatting room includes providing the chatting room including channel information corresponding to the chatting room based on the channel information each responding to the plurality of contents received from an external server through a communication interface.

18. A non-transitory computer-readable recording medium which stores a computer instruction causing an electronic apparatus to perform an operation while being executed by a processor of the electronic apparatus, the operation comprising:
acquiring characteristic information corresponding to a first content and a second content, respectively, based on first content information of the first content and second content information of the second content, provided the first content information of the first content and the second content information of the second content among a plurality of contents including the first content and the second content do not match each other; and
providing a chatting room for the first content and the second content provided the first content and the second content are a same content based on the first content information and the second content information, the acquired characteristic information, and meta data each corresponding to the plurality of contents stored in a memory;
wherein the meta data includes at least one of identification (ID) information or schedule information corresponding to the plurality of contents, respectively, the first content information and second content information including at least one of country type information or the ID information corresponding to the first content and the second content, respectively, and
the acquiring of the characteristic information includes identifying whether the first content information and the second content information are matched each other by comparing first country type information and first ID information, included in the first content information, with second country type information and second ID information, included in the second content information.

* * * * *